(12) United States Patent
Aguirre

(10) Patent No.: US 8,241,688 B2
(45) Date of Patent: Aug. 14, 2012

(54) TRIPE CUTTING BOARD AND METHOD FOR MAKING MENUDO

(76) Inventor: Daniel M. Aguirre, Orange, CA (US)

( * ) Notice: Subject to any disclaimer, the term of this patent is extended or adjusted under 35 U.S.C. 154(b) by 14 days.

(21) Appl. No.: 13/065,404

(22) Filed: Mar. 22, 2011

(65) Prior Publication Data

US 2011/0232441 A1    Sep. 29, 2011

Related U.S. Application Data

(60) Provisional application No. 61/341,028, filed on Mar. 24, 2010.

(51) Int. Cl.
*B26D 3/00* (2006.01)

(52) U.S. Cl. ....................................................... 426/518

(58) Field of Classification Search .................. 426/518, 426/802; 83/762, 761, 454–455, 468.1; 269/87.2; 99/324, 357, 449–450
See application file for complete search history.

(56) References Cited

U.S. PATENT DOCUMENTS

| | | | | |
|---|---|---|---|---|
| 1,072,450 A * | 9/1913 | Hamblin | ........................ | 83/762 |
| 2,283,249 A * | 5/1942 | Gibson | ........................ | 83/466.1 |
| 2,352,125 A * | 6/1944 | Sager | ........................ | 83/762 |
| 4,100,676 A * | 7/1978 | Ferguson | ........................ | 30/292 |
| 4,249,445 A * | 2/1981 | Browning | ........................ | 83/762 |
| 4,964,323 A * | 10/1990 | Fortney | ........................ | 83/167 |
| 5,115,704 A * | 5/1992 | Hyman | ........................ | 83/467.1 |
| 5,287,784 A * | 2/1994 | Brockett | ........................ | 83/762 |
| 5,386,755 A * | 2/1995 | Schneider et al. | ........................ | 83/762 |
| D362,374 S * | 9/1995 | Roach | ........................ | D7/673 |
| 5,626,067 A * | 5/1997 | Lothe | ........................ | 83/761 |
| D383,042 S * | 9/1997 | Lach | ........................ | D7/698 |
| 5,697,276 A * | 12/1997 | Nassau | ........................ | 83/762 |
| 5,907,989 A * | 6/1999 | Sie et al. | ........................ | 83/762 |
| 7,007,583 B1 * | 3/2006 | Fiola | ........................ | 83/870 |
| D536,224 S * | 2/2007 | Berger et al. | ........................ | D7/673 |
| D654,333 S * | 2/2012 | Aguirre | ........................ | D7/698 |

* cited by examiner

*Primary Examiner* — Steven Leff

(74) *Attorney, Agent, or Firm* — Russo & Duckworth, LLP; David G. Duckworth

(57) ABSTRACT

A tripe cutting board and method of making menudo is provided. The tripe cutting board includes a base plate and opposed sidewalls so as to form an elongate structure having a central trough. These sidewalls have opposed slots formed equal distance along the length of the sidewalls for introduction of a knife blade.

The method of cutting tripe includes rolling a flat sheet of tripe into a tripe roll. The rolled tripe is then cut by slicing a knife downward between each of the opposed slots. The rolled tripe is cut into smaller rolls of tripe which are removed to form tripe strips. The tripe strips are positioned longitudinally into the cutting board trough and then cut once again to form substantially square pieces of tripe suitable for introduction into menudo soup.

2 Claims, 6 Drawing Sheets

TRIPE CUTTING BOARD AND METHOD FOR MAKING MENUDO

RELATED APPLICATIONS

This application is a continuation-in-part application of U.S. Provisional Application Ser. No. 61/341,028 filed on Mar. 24, 2010.

BACKGROUND OF THE INVENTION

Menudo is a spicy Mexican soup made with tripe, onions, tomatoes, chilies and hominy. Additional common ingredients include lime, chopped cilantro, crushed oregano and red chili peppers for a spicier taste.

Menudo is so popular in Mexico that the United States and Canadian beef producers export a substantial amount of tripe to Mexico. According to Wikipedia, in the last season of the television series Sanford & Son, Fred Sanford made a reference to the meal menudo in virtually every episode as an ongoing joke. Menudo is referred to as the "breakfast of champions" in New Mexico, Texas and Oklahoma. Furthermore, there are several menudo festivals in cities across the country.

The making of menudo is a very time intensive endeavor taking up to seven hours to make. A typical recipe includes first cleaning the meat, such as tripe which consists of beef stomach tissue. The meat is then hand-cut into strips and then into squares. This procedure is very time consuming and difficult because of the texture and toughness of the meat. Furthermore, it is very difficult to cut the meat consistently to create uniform square shapes. This can result in menudo having an inconsistency which is undesirable to the eater of the menudo dish. The recipe for menudo typically continues with the feet and tendons boiled first at low to medium heat for about three hours. Preferably, the foam is removed about every fifteen minutes for the first hour to assist in the flavor. After three hours, the stomach meat which has been cut into squares is introduced into the broth along with salt, onion, garlic and chili paste. After an additional few hours of continuous boiling, hominy is added.

Unfortunately, due to the difficulty in uniformly and quickly cutting the tripe, menudo is relatively expensive in restaurants and rarely cooked in homes. It would therefore be desirable to provide a device for cutting tripe into squares of a size suitable for menudo. Furthermore, it would be preferable that the device provided uniformity of the tripe squares to provide a consistency for the soup.

Many devices have been created for cutting food such as meats and bread. For example, U.S. Pat. No. 5,823,079 illustrates an apparatus including a central base and slotted sidewalls. The sidewalls slots are sized for receipt of a knife so that meats placed within the central space can be cut uniformly. U.S. Pat. No. 5,907,989 illustrates a rack having a central base and slotted sidewalls. In addition, the device includes a snap-in fastener for holding an electric cutting blade. U.S. Pat. No. 5,499,578 illustrates a sausage cutting device. The device includes a cylindrical cavity in which sausage is inserted. Vertical slots allow a knife blade to slice downwardly through the sausage to cut uniform slices of sausage. U.S. Pat. No. 4,056,026 illustrates a device for cutting meat for placement on skewers. The device is relatively complicated in which meat is placed in a central cavity. The device includes slots on both the left and right sides as well as the front and back sides so that meat can be cut into pieces for placement upon skewers.

Unfortunately, each of these previously developed devices have been developed for cutting meat or bread into slices, but not squares. Unfortunately, a device and method of use is needed for cutting tripe into uniform squares.

SUMMARY OF THE INVENTION

The present invention addresses the aforementioned disadvantages by providing a tripe cutting board and a method for cutting the tripe into squares suitable for introduction into menudo. The tripe cutting board includes a base plate and a pair of vertically extending sidewalls which form the tripe cutting board into an elongate structure having a central trough. The sidewalls of the tripe cutting board include vertically extending slots. The vertically extending slots extend from the top of the sidewall down to the base plate. Furthermore, the sidewall's vertical slots are provided in opposing pairs and sized to facilitate entry of a knife blade so that a knife blade can be directed downward through a pair of opposed slots so as to engage meat positioned upon the tripe cutting board base plate. Preferably, the slots include a chamfer at the slot's upper extremity for making it easier to insert a knife blade into the opposed slots. Moreover, it is preferred that the base plate includes a plurality of grooves which extend laterally across the base plate from one slot to an opposed slot. Furthermore, it is preferred that the slots extend downwardly from the top of the sidewalls to the bottom of the grooves to allow a knife blade to extend below the top of the base plate.

The method of cutting tripe for introduction into menudo includes obtaining a flat sheet of tripe meat. The tripe is then rolled to form a roll of tripe. The rolled tripe is then placed into the trough formed by the cutting board sidewalls and base plate. Once the rolled tripe is in place, a knife blade is directed downward through each of the opposing slots until the knife blade slices through the rolled tripe and engages the cutting board base plate. The rolled tripe has been cut into smaller rolls of tripe which are then removed from the tripe cutting board's central trough to form tripe strips. Preferably, the opposed slots are spaced equal distance from one another so that the strips are all of a uniform thickness.

Once cut into strips, the tripe strips are once again placed into the cutting board trough. This time, the tripe strips are positioned longitudinally. A knife blade is again sliced downwardly through each sidewall slot until engaging the cutting board base plate. This cutting action causes the tripe strips to be cut into substantially square pieces. Once cut into squares, the tripe can be easily removed from the cutting board trough for introduction into menudo soup.

DETAILED DESCRIPTION OF THE INVENTION

Figure 1:
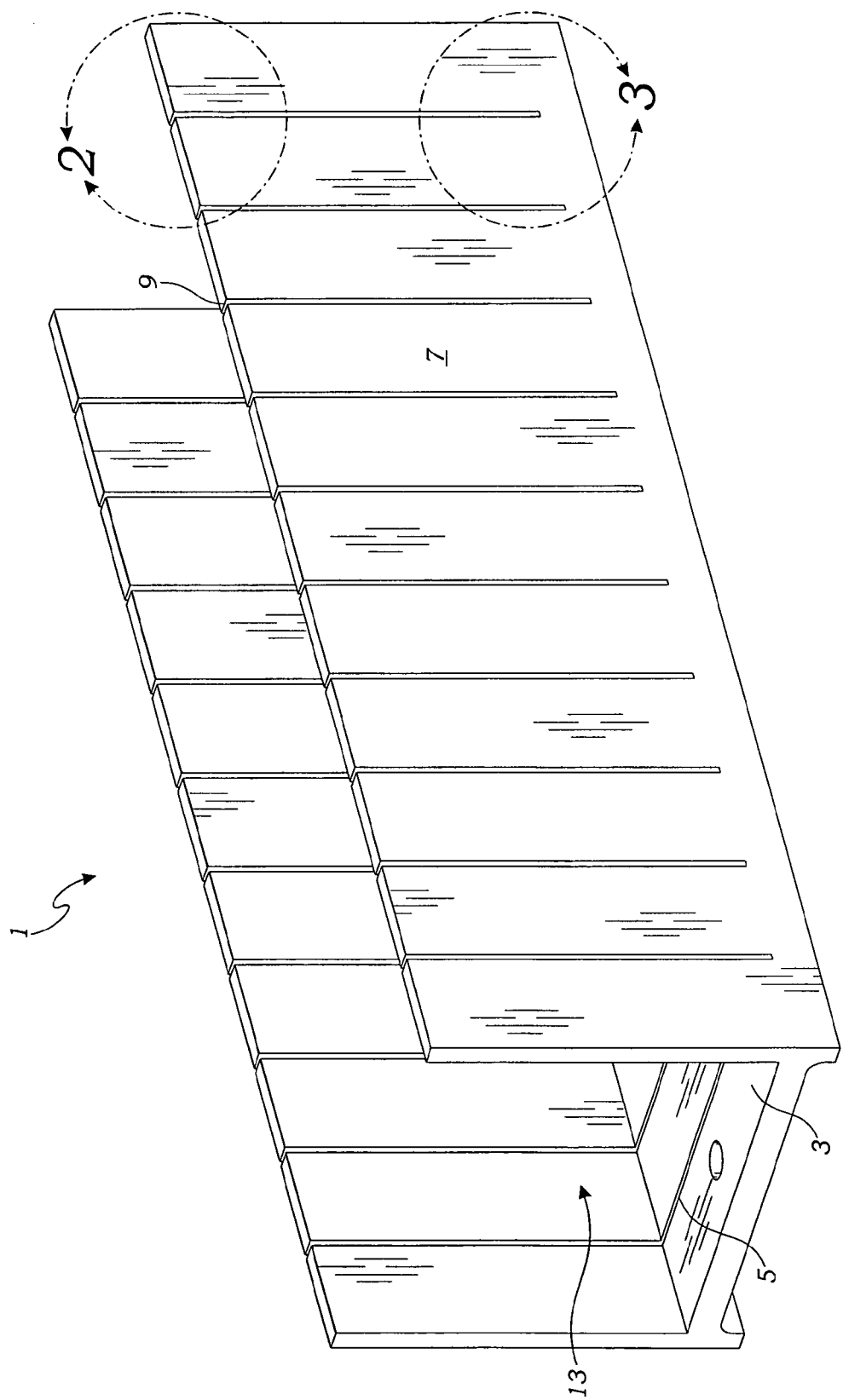
FIG. 1 is a perspective view of a tripe cutting board produced by plastic extrusion or injection molded for use with the method of cutting tripe of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 1A:
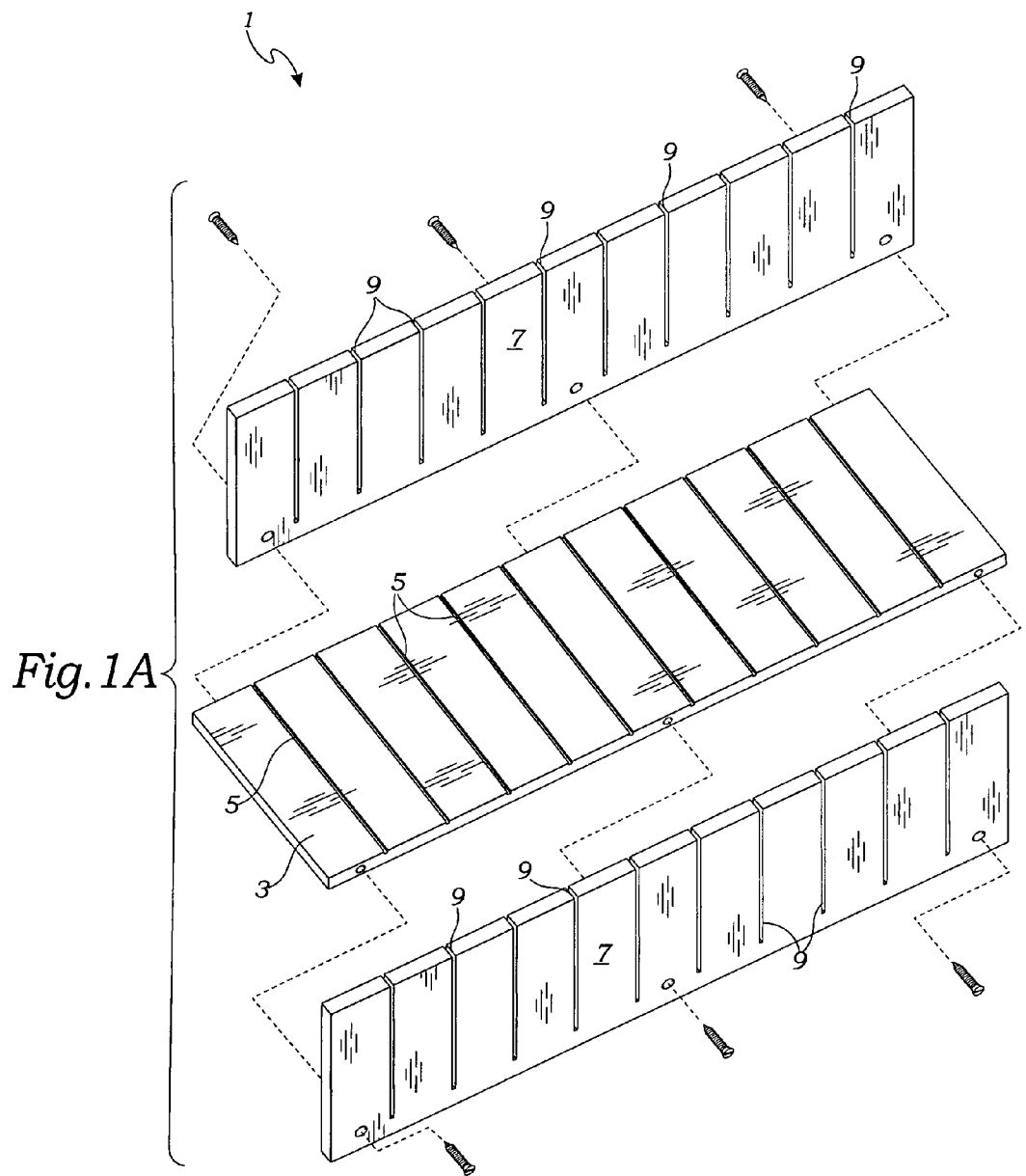
FIG. 1A is an exploded perspective view of an alternative fastened three piece tripe cutting board for use with the method of cutting tripe of the current invention.
Figure 2:
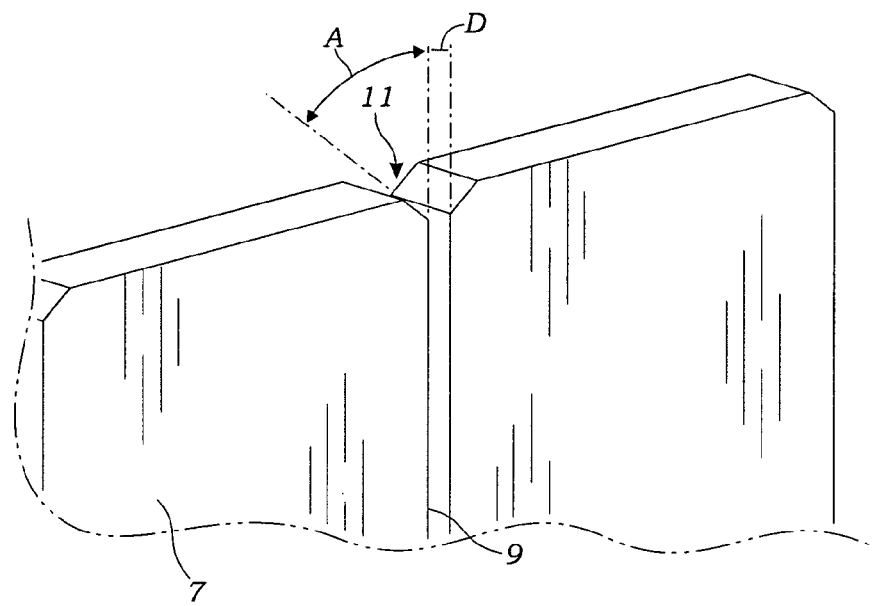
FIG. 2 is a perspective view of illustrating the chamfer entry for the slots of the tripe cutting board.
Figure 3:
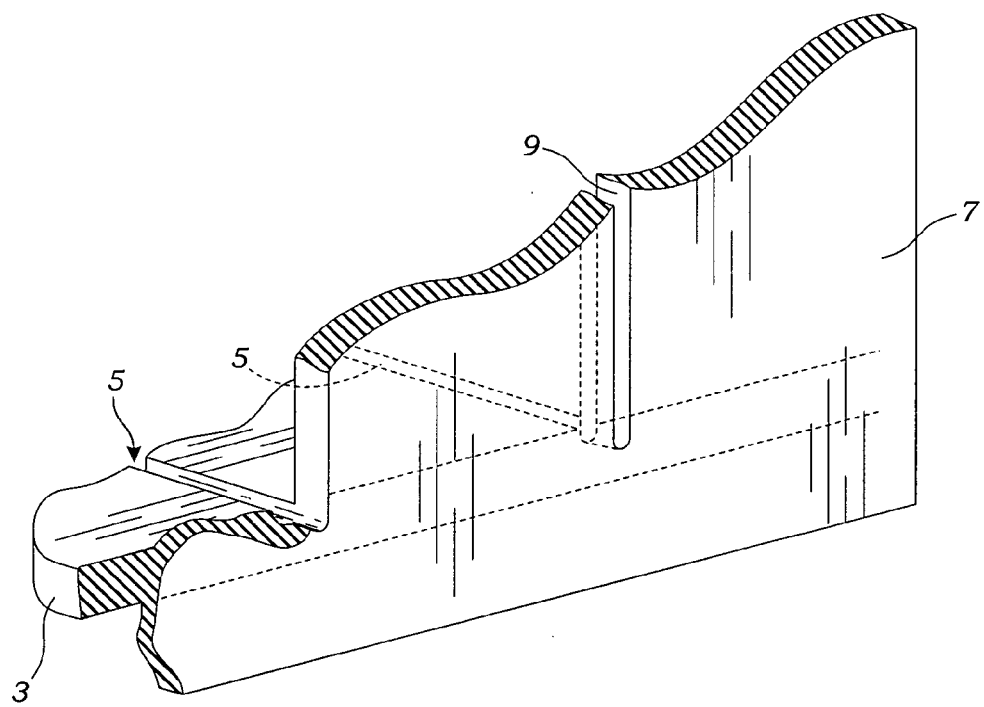
FIG. 3 is a perspective side cutaway illustrating the slots of the tripe cutting board extending below the surface of the cutting boards base.
Figure 5:
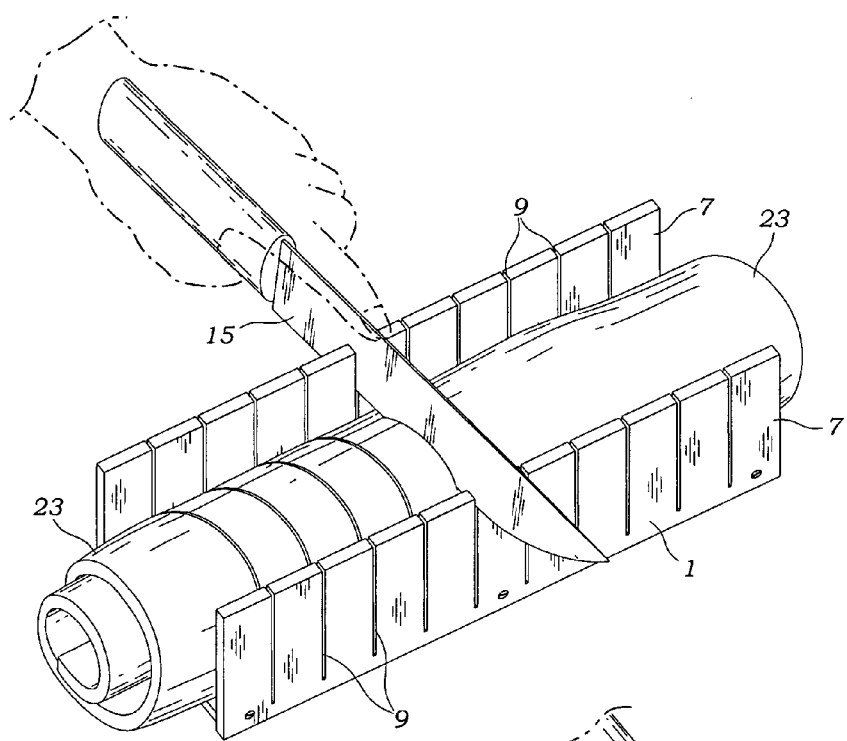
FIG. 5 is a perspective view illustrating a roll of tripe placed within the cutting boards central trough and being cut into elongate strips.
Figure 6:
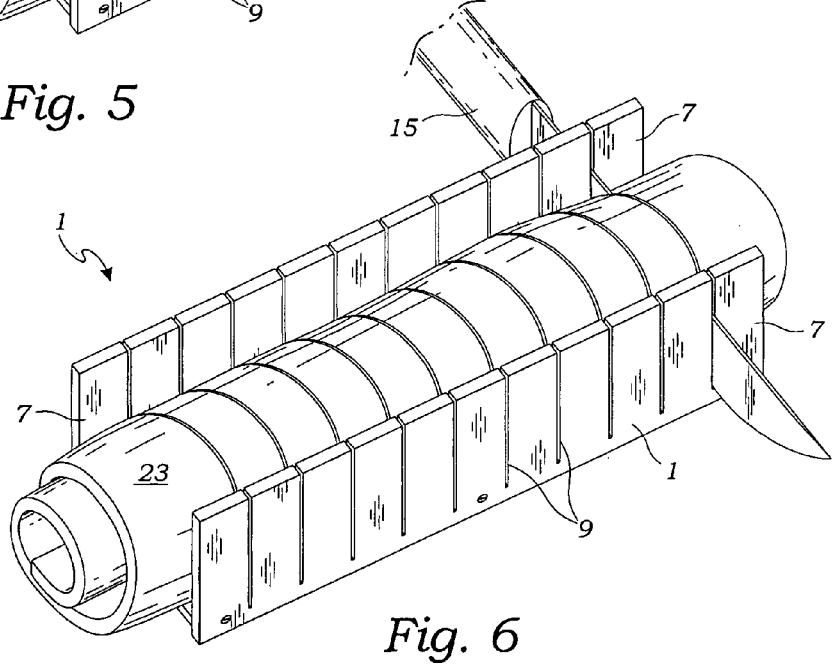
FIG. 6 is an additional perspective view illustrating the rolled tripe within the cutting boards central trough having been cut into elongate strips while the strips are still in a rolled condition.

With reference to the figures, the method of cutting tripe of the present invention utilizes a tripe cutting board 1. The tripe cutting board 1 includes a base plate 3 and a pair of opposing sidewalls 7. As illustrated in FIG. 1, the tripe cutting board 1 can be constructed from extruded plastic in one piece. Alternatively as illustrated in FIG. 1A, the tripe cutting board 1 may be made in three separate pieces affixed together with fasteners such as screws. The cutting board sidewalls 7 include vertically extending slots. Preferably, the cutting board base plate 3 includes laterally extending grooves 5, as best seen in FIGS. 1 and 1A. As illustrated in FIG. 2, preferably the upper extremities of the slots include a chamfer 11 having an angle "A" for facilitating entry of a knife blade 15, as seen in FIGS. 5 and 6. As illustrated in FIG. 3, preferably the slots extend vertically downward to below the top edge of the base plate 3 to the bottom surface of the groove 5. The depth 5 of the slot 9 below the base plate is provided so as to facilitate cutting of meat so as to allow the knife blade 15 to extend below the top of the base plate 3.

Figure 4A:
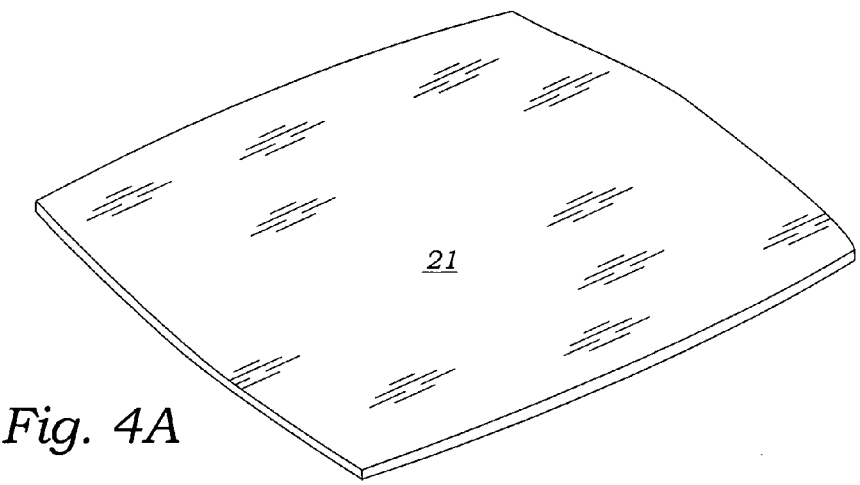
FIG. 4A is a perspective view illustrating a sample of tripe meat.
Figure 4B:
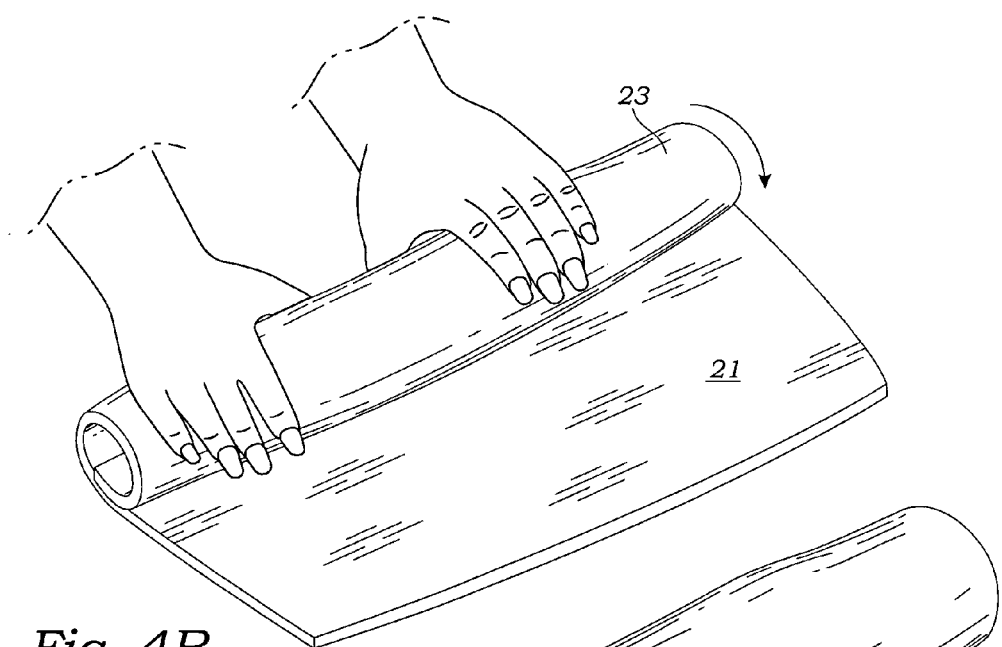
FIG. 4B is a perspective view illustrating a step of the present invention involving a person rolling tripe meat into a roll.
Figure 4C:
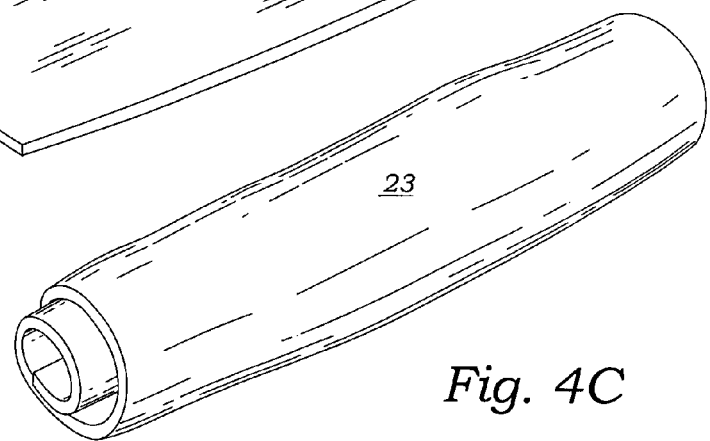
FIG. 4C is a perspective view illustrating tripe meat rolled into a roll.
Figure 7:
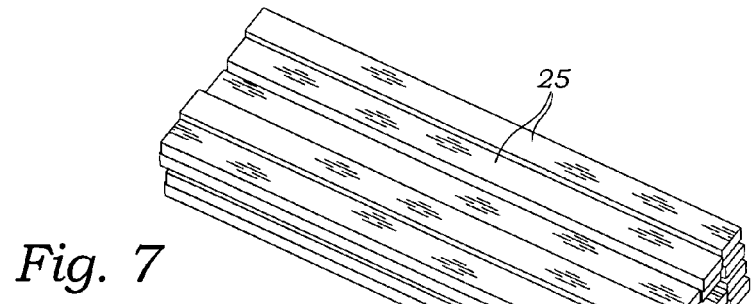
FIG. 7 is a perspective view illustrating the strips of tripe after they have been removed from the tripe cutting board.

The method of cutting tripe of the present invention includes providing a flat sheet of tripe 21, as illustrated in FIG. 4A. As illustrated in 4B, the tripe is then rolled, preferably by using ones hands, to form a roll of tripe 23 seen in FIG. 4C. As illustrated in FIG. 5, the rolled tripe 23 is then placed longitudinally into the tripe cutting board's central trough 13 formed by the base plate 3 and sidewalls 7. Thereafter, as illustrated in FIG. 6, a knife blade 15 is sliced consecutively through each of the vertical slots 9 so as to cut the tripe into smaller rolls of tripe. As illustrated in FIG. 7, the individual rolls of tripe are removed from the tripe cutting board's central trough 13 to form tripe strips 25. As seen in FIG. 7, the tripe cutting board provides extremely uniform slices of meat wherein each strip of tripe has an equal width.

Figure 8:
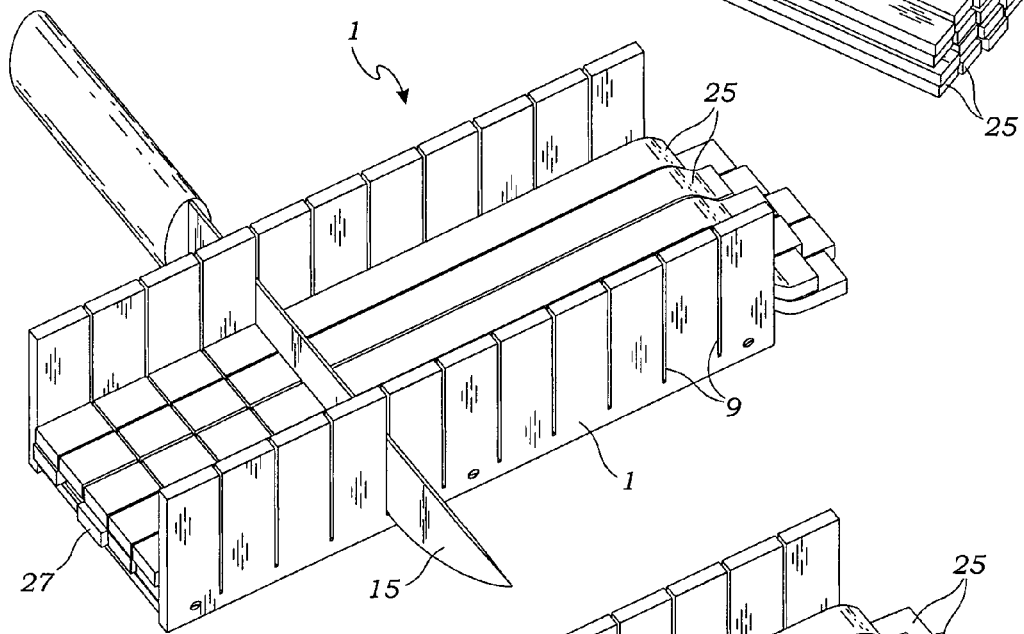
FIG. 8 is a perspective view illustrating the strips of tripe having been placed into the central trough of the tripe cutting board and being cut into squares.
Figure 9:
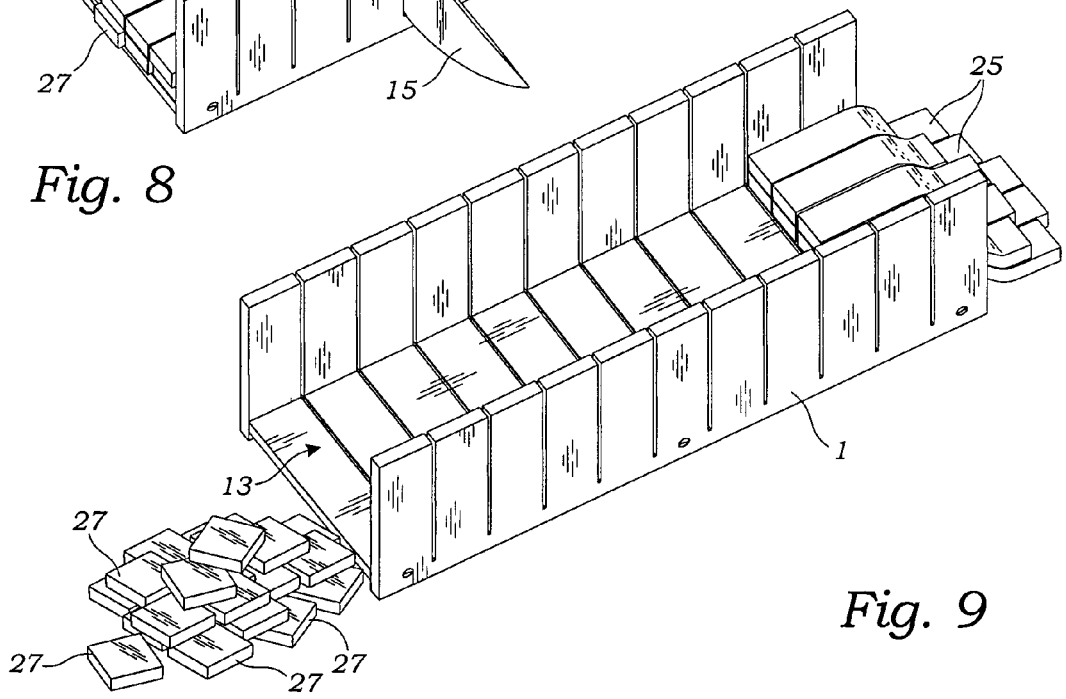
FIG. 9 is a perspective view illustrating the squares of tripe having been removed from the tripe cutting board.

As illustrated in FIG. 8, the individual strips of tripe 25 are then laid longitudinally into the cutting boards central trough 13. A knife blade 15 again is sliced downwardly through each sidewall slot 9 so as to cut each tripe strip into a plurality of tripe squares 27. As seen in FIG. 9, the uniform tripe squares are then suitable for introduction into menudo soup.

Since still additional modifications of the method of cutting tripe may be made, it is not intended that the invention be limited except by the following claims. Having described my invention in such terms so as to enable a person skilled in the art to understand the invention, recreate the invention and practice it, and having presently identified the presently preferred embodiments, I claim the apparatus and method for cutting tripe as described above.

Having disclosed the invention in such terms as to enable persons skilled in the art to understand and practice it and, having identified the presently preferred embodiments thereof, I claim:

1. A method of cutting tripe comprising:
   providing a cutting board having two parallel sidewalls each having a top and bottom, the sidewalls connected by baseplate having a top planar surface to form a central trough, the parallel sidewalls each having a plurality of opposed vertically extending guide slots for receipt of a knife, said slots extending from the tops of the sidewalls to the baseplate's top surface;
   providing a knife;
   providing a flat sheet of tripe;
   rolling the flat sheet of tripe to form an elongate roll of tripe with roll defining a longitudinal axis;
   positioning the elongate roll of tripe in the cutting board's central trough with roll's longitudinal axis parallel with the cutting board sidewalls;
   cutting the roll of tripe into a plurality of smaller rolls of tripe;
   removing the plurality of smaller rolls of tripe from the cutting board trough;
   unrolling the smaller rolls of tripe to form a plurality of strips of tripe;
   positioning the plurality of strips of tripe into the cutting board's central trough parallel with the cutting board sidewalls;
   cutting the plurality of strips of tripe into a plurality of squares of tripe; and
   removing the plurality of squares of tripe from the cutting board trough for use in making menudo.

2. The method of cutting tripe of claim 1 wherein the slots extend from the tops of the sidewalls to below the baseplate's top surface, and the baseplate has a plurality of grooves projecting below the baseplate surface with each groove extending laterally from one sidewall slot to an opposed sidewall slot.

\* \* \* \* \*